(12) United States Patent
Conyngham (10) Patent No.: US 10,970,045 B2
(45) Date of Patent: Apr. 6, 2021

(54) APPARATUS AND METHOD FOR HIGH-PRECISION COMPUTE OF LOG1P( )

(71) Applicant: Samsung Electronics Co., Ltd., Suwon-si (KR)

(72) Inventor: Jim Conyngham, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 99 days.

(21) Appl. No.: 16/275,302

(22) Filed: Feb. 13, 2019

(65) Prior Publication Data

US 2020/0192635 A1    Jun. 18, 2020

Related U.S. Application Data

(60) Provisional application No. 62/780,922, filed on Dec. 17, 2018.

(51) Int. Cl.
*G06F 7/556*    (2006.01)

(52) U.S. Cl.
CPC .................................... *G06F 7/556* (2013.01)

(58) Field of Classification Search
None
See application file for complete search history.

(56) References Cited

U.S. PATENT DOCUMENTS

| | | | | |
|---|---|---|---|---|
| 5,197,024 A | * | 3/1993 | Pickett | G06F 7/483 708/517 |
| 5,452,241 A | * | 9/1995 | Desrosiers | G06F 7/4876 708/495 |
| 7,031,993 B1 | | 4/2006 | Xie et al. | |
| 7,366,748 B1 | * | 4/2008 | Tang | G06F 7/544 708/446 |
| 8,037,119 B1 | * | 10/2011 | Oberman | G06F 17/10 708/503 |
| 8,914,801 B2 | | 12/2014 | Anand et al. | |
| 9,465,580 B2 | * | 10/2016 | Pineiro | G06F 7/57 |
| 2005/0203980 A1 | * | 9/2005 | Harrison | G06F 7/548 708/290 |
| 2009/0100121 A1 | * | 4/2009 | Mittal | H03M 7/30 708/495 |
| 2013/0060829 A1 | * | 3/2013 | Spencer | G06F 7/548 708/440 |
| 2014/0222883 A1 | * | 8/2014 | Pineiro | G06F 9/3832 708/523 |

FOREIGN PATENT DOCUMENTS

JP    4337719 B2    9/2009

* cited by examiner

*Primary Examiner* — Michael D. Yaary
(74) *Attorney, Agent, or Firm* — Renaissance IP Law Group LLP (57) ABSTRACT

Inventive aspects include a high-precision log 1p( ) compute logic section of a computing machine to approximate a function $F(x)=\log 1p(x)=\ln(x+1)$, using an estimation function $E(x)$, and to at least: (i) receive an input x, (ii) compute $(x+1)$ using only native precision, (iii) compute an integer N such that: $4/3 \cdot 2^{N-1} \leq (x+1) \leq 4/3 \cdot 2^N$, (iv) compute $f_N(x)=Sx+(S-1)$ where $S=2^{-N}$, (v) compute $E(f_N(x))$, and (vi) return a value $v=E(f_N(x))+N \ln(2)$ as an approximation of $F(x)=\log 1p(x)$.

18 Claims, 10 Drawing Sheets

APPARATUS AND METHOD FOR HIGH-PRECISION COMPUTE OF LOG1P( )

BACKGROUND

The present disclosure relates to high-precision computation, and more particularly, to an apparatus and method for high-precision compute of log 1p( ).

Today's computing machines are more powerful and efficient than ever before. Graphics processing units (GPUs) can execute billions of calculations per second, for example. Processing speeds of embedded memory and processors included in other devices such as smart phones, tablets, laptop computers, and personal computers continue to improve. Nevertheless, some kinds of computations are so resource-intensive that approximations are used instead, or look-up tables are otherwise relied upon, which take up area on silicon chips, increase access latency, increase memory bandwidth, and lead to an overall increase in the memory footprint of a device.

One way of implementing a transcendental function, such as a logarithm, is to implement a different non-transcendental mathematical function, which approximates the desired function to sufficient accuracy over a limited domain, but is simpler to compute. Such approximation functions are typically simple polynomials, ratios of polynomials, Taylor series, splines (i.e., a piecewise set of simpler approximation over subdomains), Chebyshez polynomials, or some combination of those. When the input value is outside the limited domain of the approximation, implementations take advantage of mathematical identities to derive another value which is in the domain of the approximation, and derive the correct result using the identity formula. This is known in the industry as "range reduction," although "domain reduction" would really be more accurate.

For a simple log function such as $\ln(x)$, the range reduction identity is $\ln(x)=\ln(S*x)-\ln(S)$, where S is some scale factor, usually a power of two, and the domain of the approximation function is usually a power of two including $x=1.0$. For example: $\mathrm{sqrt}(0.5) \leq x \leq \mathrm{sqrt}(2)$.

For $\log 1p(x)=\ln(1+x)$, the range reduction identity is $\log 1p(x)=\log 1p(S*(1+x)-1)-\ln(S)$, where S is some scale factor, usually a power of two, and the domain of the approximation function is some range including $x=0$. A difficulty arises when the input x is of small magnitude (i.e., absolute value). Combining terms "x+1" with native precision arithmetic would unacceptably loose precision. For example, if x is $O(2^{-10})$, this operation would lose 10 bits of precision. Therefore, it is current practice to perform the computation of "$S*(1+x)-1$" using extended-precision arithmetic, which is generally expensive in terms of compute resources (e.g., time, space, energy).

BRIEF SUMMARY

Inventive aspects include a high-precision log 1p( ) compute logic section of a computing machine to approximate a function $F(x)=\log 1p(x)=\ln(x+1)$, using an estimation function $E(x)$, and to at least: (i) receive an input x, (ii) compute $(x+1)$ using only native precision, (iii) compute an integer N such that: $\frac{4}{3}2^{N-1} \leq (x+1) \leq \frac{4}{3}2^{N}$, (iv) compute $f_N(x)=Sx+(S-1)$ where $s=2^{-N}$, (v) compute $E(f_N(x))$, and (vi) return a value $v=E(f_N(x))+N\ln(2)$ as an approximation of $F(x)=\log 1p(x)$.

Some embodiments include a computer-implemented method for high-precision compute of log 1p( ). The method may include approximating, by a high-precision log 1p( ) compute logic section of a computing machine, a function $F(x)=\log 1p(x)=\ln(x+1)$, using an estimation function $E(x)$, receiving, by the high-precision log 1p( ) compute logic section of the computing machine, an input x, computing, by the high-precision log 1p( ) compute logic section of the computing machine, $(x+1)$ using only native precision, computing, by the high-precision log 1p( ) compute logic section of the computing machine, an integer N such that: $\frac{4}{3}2^{N-1} \leq (x+1) \leq \frac{4}{3}2^{N}$, computing, by the high-precision log 1p( ) compute logic section of the computing machine, $f_N(x)=Sx+(S-1)$ where $S=2^{-N}$, computing, by the high-precision log 1p( ) compute logic section of the computing machine, $E(f_N(x))$, and returning, by the high-precision log 1p( ) compute logic section of the computing machine, a value $v=E(f_N(x))+N\ln(2)$ as an approximation of $F(x)=\log 1p(x)$.

Certain of the inventive features may be best achieved by implementing them in a graphics processing unit (GPU), or within an ARM processor core. Other types of processors or application specific integrated circuits (ASICs) can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic section could be termed a second logic section, and, similarly, a second logic section could be termed a first logic section, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A more efficient system and method for implementing the log 1p( ) function using fewer compute resources are disclosed. Improved metrics include: instruction count, execution time, register count, power dissipated.

Embodiments disclosed herein enable computer-implemented automatic performance of range reduction of an input value using only native-precision arithmetic operations (i.e., without using extended-precision arithmetic or a constant memory table), thereby eliminating the need for more expensive extended-precision arithmetic operations. That is, embodiments disclosed herein allow computer-implemented automatic performance of the range reduction portion of a log 1p( ) function without using extended-precision arithmetic or a constant memory table. Instead, only a relatively few native-precision computer instructions may be used. The log 1p( ) function is used by OpenCL and other computer architectural standards. The computer-implemented automatic performance of range reduction technique disclosed herein is more efficient, has a lower instruction count, a lower clock cycle count, a lower execution time, and results in lower power dissipation. Moreover, less silicon area is required, access latency is improved, as well as memory bandwidth and memory footprint. There is no need for lookup tables or extended precision arithmetic.

Figure 1A:
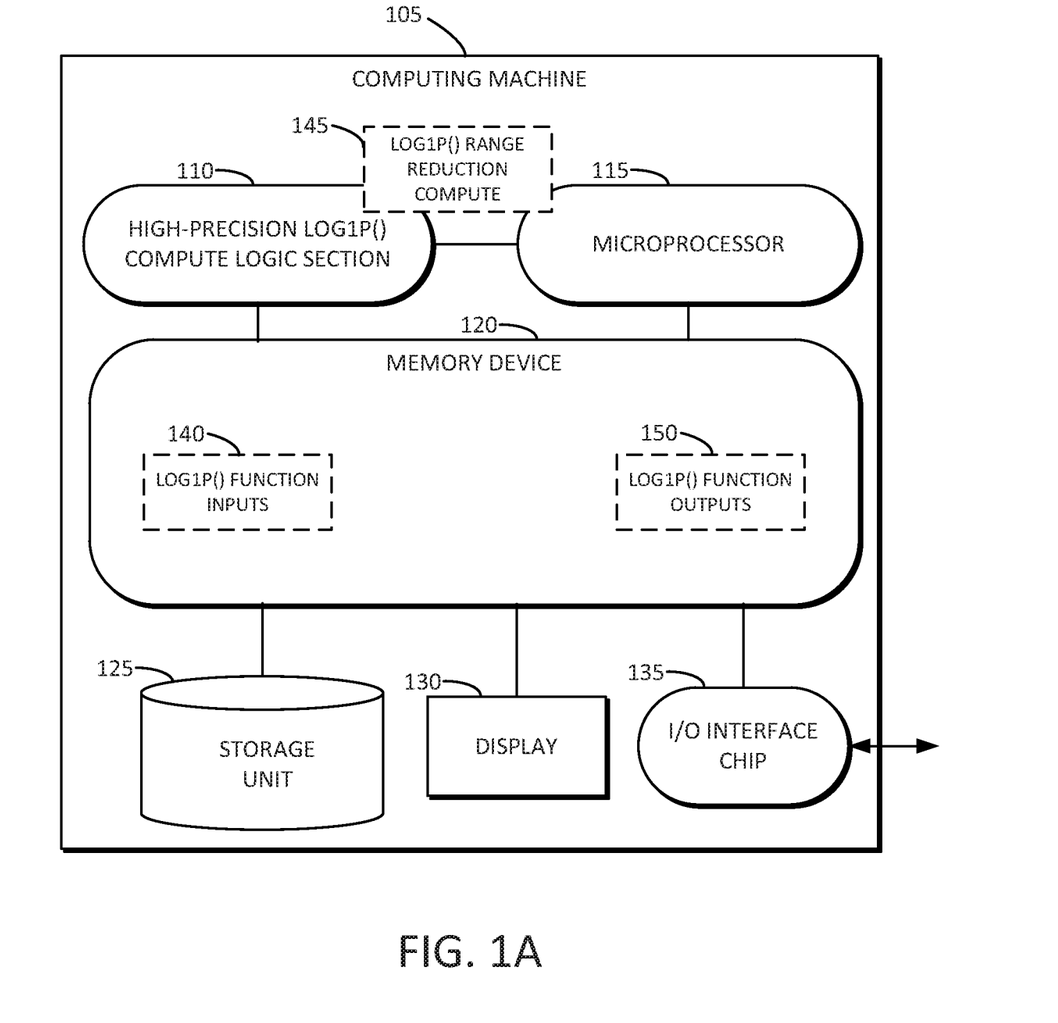
FIG. 1A is an example block diagram of a computing machine including a high-precision log 1p( ) compute logic section in accordance with embodiments disclosed herein.
Figure 1B:
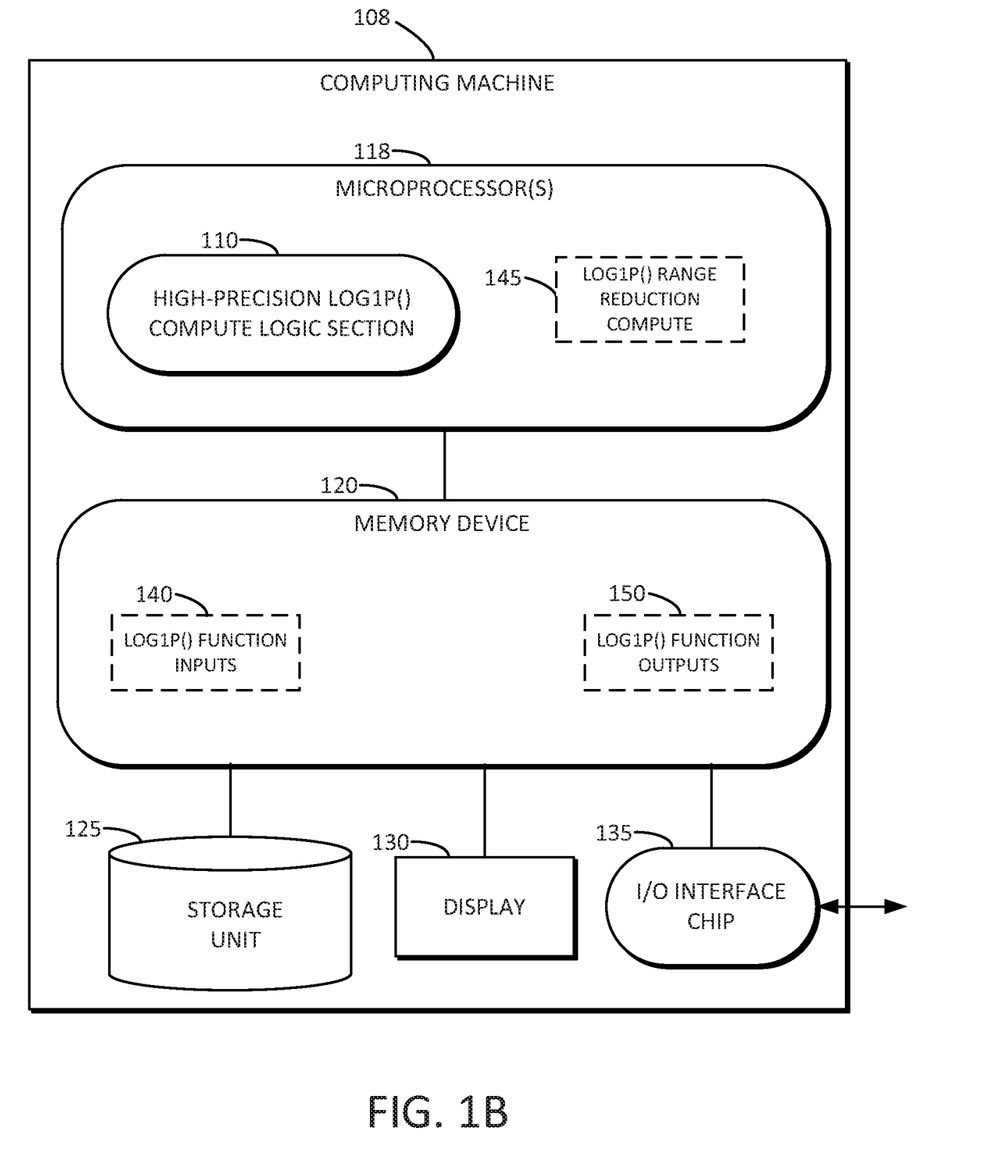
FIG. 1B is an example block diagram of another computing machine including a high-precision log 1p( ) compute logic section embedded in one or more microprocessors in accordance with embodiments disclosed herein.
Figure 1C:
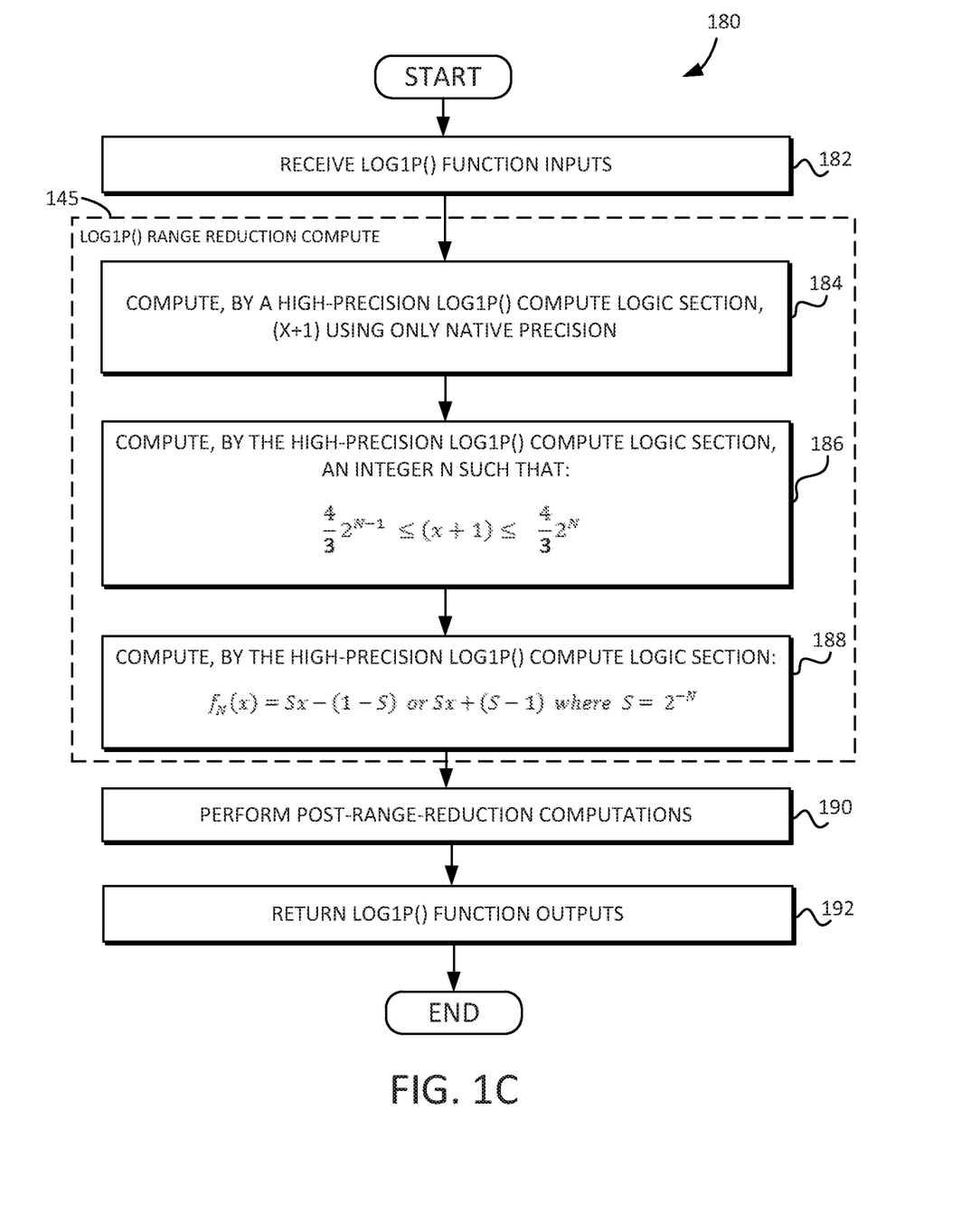
FIG. 1C is an example flow diagram illustrating a technique for performing a high-precision log 1p( ) computation in accordance with embodiments disclosed herein.

FIG. 1A is an example block diagram of a computing machine 105 including a high-precision log 1p( ) compute logic section 110 in accordance with embodiments disclosed herein. FIG. 1B is an example block diagram of another computing machine 108 including a high-precision log 1p( ) compute logic section 110 embedded in one or more microprocessors 118 in accordance with embodiments disclosed herein. FIG. 1C is an example flow diagram 180 illustrating a technique for performing a high-precision log 1p( ) computation in accordance with embodiments disclosed herein. Reference is now made to FIGS. 1A, 1B, and 1C.

The computing machine 105 of FIG. 1A may include a high-precision log 1p( ) compute logic section 110, further described in detail below. The computing machine 105 may also include a microprocessor 115, a memory device 120, a storage unit 125, a display 130, and/or an Input/Output (I/O) interface chip 135. The computing machine 108 of FIG. 1B is similar to that of FIG. 1A, with the notable difference that the computing machine 108 may include one or more microprocessors 118, and the high-precision log 1p( ) compute logic section may be embedded within or otherwise be a part of or a hardware section of the one or more microprocessors 118. Embodiments disclosed herein are capable of performing range reduction for log 1p(x) using only a few native precision arithmetic operations.

As shown at 182 of FIG. 1C, the high-precision log 1p( ) compute logic section 110 may receive log 1p( ) function inputs 140 (of FIGS. 1A and 1B). Next, the high-precision log 1p( ) compute logic section 110 may perform range reduction at 145 in accordance with embodiments disclosed herein. Specifically, at 184, the high-precision log 1p( ) compute logic section 110 may compute (x+1) using only native precision. At 186, the high-precision log 1p( ) compute logic section 110 may use the result from 184, and compute an integer N such that: $\frac{4}{3}2^{N-1} \leq (x+1) \leq \frac{4}{3}2^N$. At 188, the high-precision log 1p( ) compute logic section 110 may compute $f_N(x) = Sx - (1-S)$ or $Sx + (S-1)$ where $S = 2^{-N}$.

After the above range reduction technique is performed, the following is true: $-\frac{1}{3} \leq f_N(x) \leq \frac{1}{3}$. Thereafter, post-range-reduction computations associated with the log 1p(x) function may be performed at 190 using standard techniques. For example, an approximation of log 1p ($f_N(x)$) may be computed using known techniques. In addition, log 1p(x)=log 1p($f_N(x)$)−ln(S), or log 1p($f_N(x)$)+N ln(2) may be computed and returned at 192 as log 1p( ) function outputs 150.

The value of (x+1) computed at 184 is only used to compute the integer N in step 186. In other words, the value of (x+1) need not be used in any subsequent stages. This combination may lose precision as described above when x has a very small magnitude. For those values, however, the computed integer N will be unambiguous despite the loss of significant digits. Alternate methods of implementing step 186 are possible without departing from the inventive concept disclosed herein, and will depend on the instruction set architecture and/or programming language of the computer used.

At 188, the computation of $2^{-N}$ and $2^{-N}x$ are precise operations, where only the exponent of a floating-point number is modified, not the significand. The combination of (S−1) is precise for small values of N, with rounding and a slight loss of precision for large-magnitude values of N. For those values, however, the final result is dominated by the +N ln(2) term, so this rounding has negligible effect, if any, on the final result. The final addition in this step combining Sx+(S−1) will be an exact operation without rounding for most inputs. For a small subset of inputs, rounding may occur, but in the worst case, the result is equivalent to losing 1 bit, or 1 ULP of the input value. The precedence of operators in this step is important; evaluating (Sx+S)−1, for example, would produce a vastly different and less accurate result.

Following is pseudocode for one possible implementation of this range reduction, using C++ computer programming language conventions:

```
// This assumes IEEE-754 single precision floating point
arithmetic
float log1p(float x)
{
    // ... Omitted: code here to handle special cases where
    // x is infinite, NotANumber, or x <= -1.0f
    // Begin range reduction
    // This assumes x > -1.0f
    // step 1:
    float step1 = x + 1.0f;
    // step 2:
    // if the significand of step1 > 0x1.555555,
    // increment it's exponent.
    *(int32_t *)&step1 += 0x00555555;
    // let N be the exponent:
    int N;
    (void) frexpf (step1, &N);
    --N;
    // step 3:
    float S = ldexp(1.0f, -N);
    float step3 = ldexp(x, -N) + (S - 1.0f);
    // End range reduction
    // ... Omitted: the rest of the log1p( ) function
    // using standard approximation techniques.
```

In designing approximation functions, there are always trade-offs between the size of the domain of the approximation and the complexity (i.e., and therefore cost) of computing the approximation. The reduced value produced by this method is guaranteed to be in the limited range $-\frac{1}{3} \leq f_N(x) \leq \frac{1}{3}$. This may be a smaller domain than supported by the approximation functions used in some implementations of log 1p( ), and so additional improvements, by simplifying the approximation function, may be implemented.

In some embodiments, a non-transitory, computer-readable storage medium having stored thereon instructions that, when executed by a computer processor, cause the high-precision log 1p( ) compute logic section 110 to approximate the function F(x)=log 1p (x)=ln(x+1), using an estimation function E(x), and to at least: (i) receive an input x, (ii) compute (x+1) using only native precision, (iii) compute an integer N such that: $\frac{2}{3}2^{N-1} \leq (x+1) \leq \frac{4}{3}2^N$, (iv) compute $f_N(x)$ Sx+(S−1) where $S=2^{-N}$, (v) compute $E(f_N(x))$, and (vi) return a value $v=E(f_N(x))+N \ln(2)$ as an approximation of F(x)=log 1p(x).

Figure 1D:
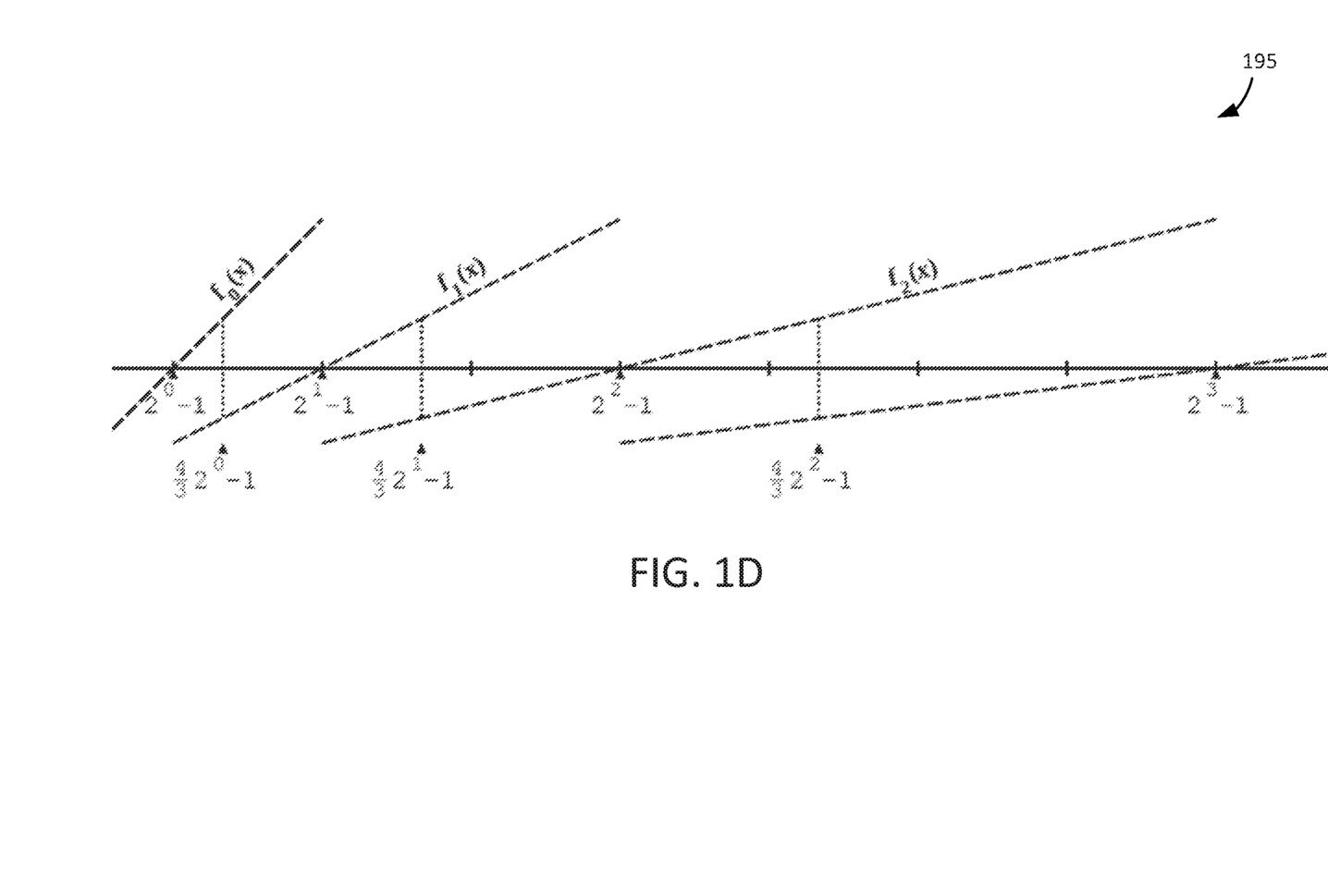
FIG. 1D is a graph showing that each function of the set of functions $f_N$ is linear in accordance with embodiments disclosed herein.

FIG. 1D is a graph 195 showing that each function of the set of functions $f_N$ is linear in accordance with embodiments disclosed herein. There is little or no loss of precision at step 188 if and only if N is properly chosen to minimize the magnitude of $f_N(x)$. Put differently, if N satisfied the inequality, then the magnitude of the range-reduced value computed at 188 must be minimal. As shown in FIG. 1D, each function of the set is linear, intercepts the X axis at $2^N-1$, and has a slope $2^{-N}$. The preferred value for N is the exponent of a nearby zero-crossing. The cusp of choosing between successive integers is defined by the point at which $f_N(x)$ and $f_{N+1}(x)$ have the same magnitude. For example:

$$|f(y)|=|f_{N+1}(y)| \text{ or } f_N(y)=-f_{N+1}(y)$$

$$2^{-N}(1+y)-1=-2^{-(N+1)}(1+y)+1$$

$$(1+y)(2^{-N}+2^{-(N+1)})=2$$

$$(1+y)\frac{3}{2}2^{-N}=2$$

$$(1+y)=\frac{4}{3}2^N$$

For IEEE-754 base-2 floating point numbers (i.e., that are not denormal), the discrimination between two successive integer values for N will always depend only on the bits of the significand of (1+x), and not on the exponent bits. The pseudocode above treats the bits of the value as a fixed-point number and adds a certain bit pattern to it, and therefore works by carrying one from the significand bit field to the exponent bit field-incrementing the exponent—if and only if the significand is larger than the cusp value. For IEEE-754 floating point arithmetic, (1.0+x) cannot be a denormal.

For any choice of N: $f_N(y)=2^{-N}(\frac{4}{3}2^N)-1=\frac{1}{3}$.

So for a properly chosen value of N, the reduced value is: $-\frac{1}{3} \leq f_N(x) \leq \frac{1}{3}$.

The range reduction technique disclosed herein can be implemented in various high-level computer languages, assembly languages, machine code, or in hardware. The disclosed technique can be implemented for different types of floating-point numbers. The pseudocode above shows one possible implementation for IEEE 754 single precision floating point, but this could equally be implemented for IEEE 754 double precision, or even for base-10 decimal floating point formats, formats not covered by IEEE 754, etc. For a radix other than 2, the equations in step 186 and step 188 would have to be modified accordingly.

Alternate ways of implementing step 2 are possible. The pseudocode example given above is just one possibility. Another variation includes the following:

```
// step 186:
// (This assumes IEEE-754 single precision floating
point arithmetic)
    int N = ((*(int32_t *)&step1) + (0x00555555-0x3f800000))
    >> 23;
```

The log 1p( ) function inputs 140 and/or the log 1p( ) function outputs 150 may be temporarily stored in the memory device 120. The memory device 120 can be, for example, a volatile memory device such as a dynamic random access memory (DRAM). The computing machine 105 or 108 may store the log 1p( ) function outputs 150 on a more permanent basis in the storage unit 125, show the log 1p( ) function outputs 150 on the display 130, and/or transmit the log 1p( ) function outputs 150 via the I/O interface chip 135. The storage unit 125 can be, for example, a non-volatile memory such as a solid state drive (SDD), a magnetic storage device, or the like.

Figure 2:
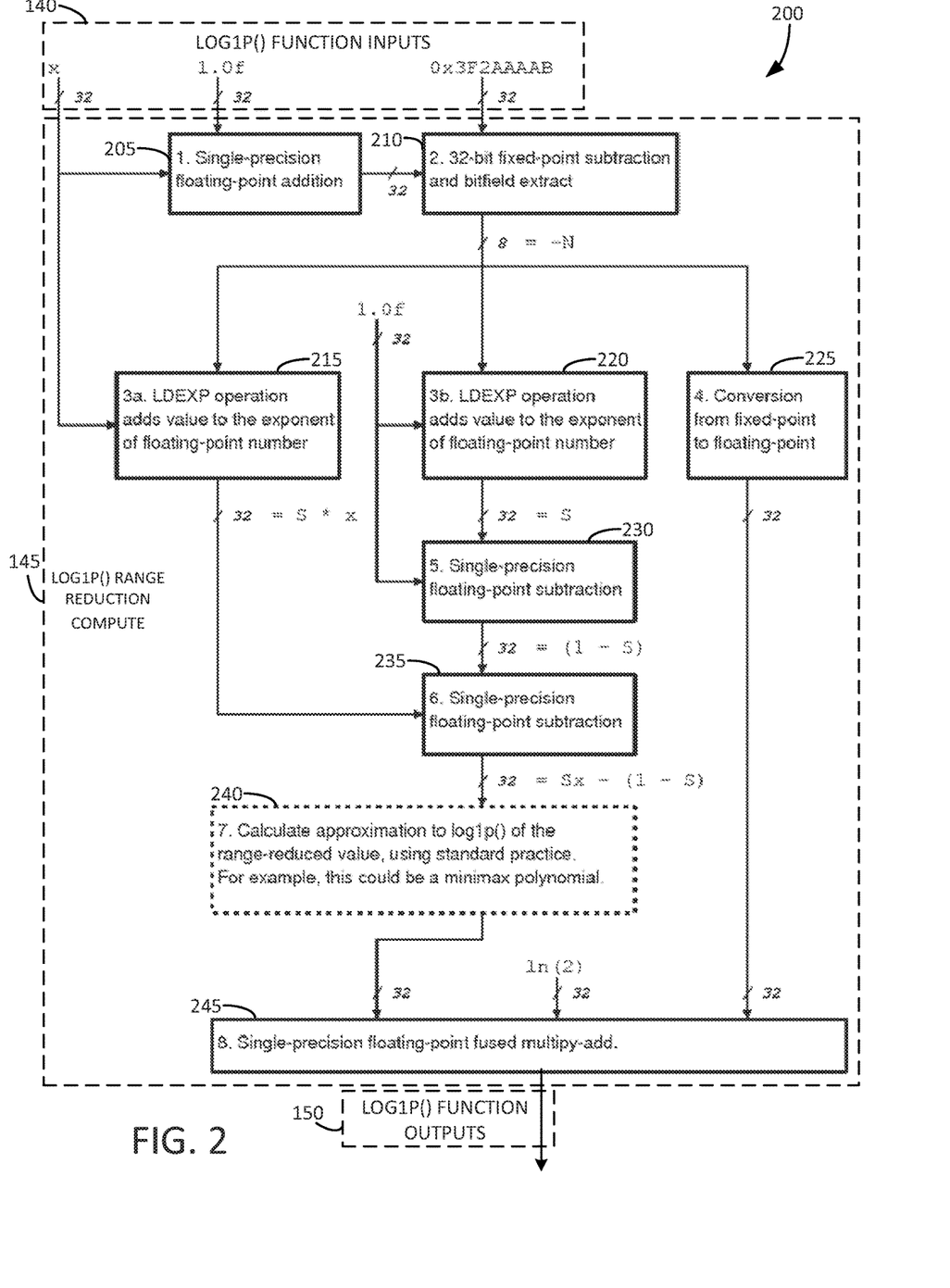
FIG. 2 is an example flow diagram illustrating another technique for performing a high-precision log 1p( ) computation in accordance with embodiments disclosed herein.

FIG. 2 is an example flow diagram 200 illustrating a technique for performing a high-precision log 1p( ) computation in accordance with embodiments disclosed herein. The flow diagram 200 illustrates another possible implementation of the range reduction for IEEE-754 single precision arithmetic.

At 140, the log 1p( ) function inputs may be received. At 145, the high-precision log 1p( ) logic section 110 may perform range reduction operations. Specifically, at 205, the high-precision log 1p( ) logic section 110 may perform a single-precision floating-point addition to compute (1.0f+x). At 210, the high-precision log 1p( ) logic section 110 may perform a 32-bit fixed-point subtraction, which subtracts the result of step 205 from a constant value, combined with a bit-field extraction. There need not be type conversion of the input. The 32 bits produced at 205 may be reinterpreted as a fixed-point number. This operation adds the value ⅔ to the significand bit field of the input, so that if the significand of that floating-point value >½, then there is a carry into the exponent bit field, incrementing the exponent. Also, the exponent bias of the IEEE-754 format may be subtracted from the exponent. The resulting exponent bitfield is extracted (e.g., it may be sign-extended), and output as a two-'s complement fixed-point value. The significand and sign bits may be discarded. The entire operation may be negated, so the output value is −N.

Steps 215 and 220 execute LDEXP operations. The fixed-point input value may be added to the exponent of the floating-point value, effectively multiplying it by $2^{(-N)}$. Since the significand of the floating-point value is not modified, this is an exact operation with no loss of precision. The step 220 takes a constant input of 1.0f and computes $S=2^{(-N)}$. The step 215 takes the x input and computes S*x.

At 225, the high-precision log 1p( ) logic section 110 may perform a conversion operation, to convert the value of N from fixed-point to floating-point.

At 230, the high-precision log 1p( ) logic section 110 may perform a single-precision floating-point subtraction to compute (1.0f−S). Rounding only occurs in this step for extreme values of N, and even then the loss of precision due to this rounding can usually be ignored.

At 235, the high-precision log 1p( ) logic section 110 may perform a single-precision floating-point subtraction to compute f_N (x)=(S*x−(1.0f−S)). Since this is computing the difference between two values of comparable magnitude, for most input values there is no rounding and this is an exact operation. There are some exceptions for input values where N is computed to be +1, and some rounding occurs in those cases, but generally this a small loss of precision can be ignored.

At 240, the high-precision log 1p( ) logic section 110 may compute the log 1p( ) function on the range-reduced floating-point result of step 235, using any of the standard techniques. For example, this could be the calculation of a minimax polynomial. At 245, the high-precision log 1p( ) logic section 110 may compute the final result, log 1p(f_N (x))+N ln(2) using a single-precision fused-multiply-add operation. The log 1p( ) function outputs may be returned at 150.

Figure 3:
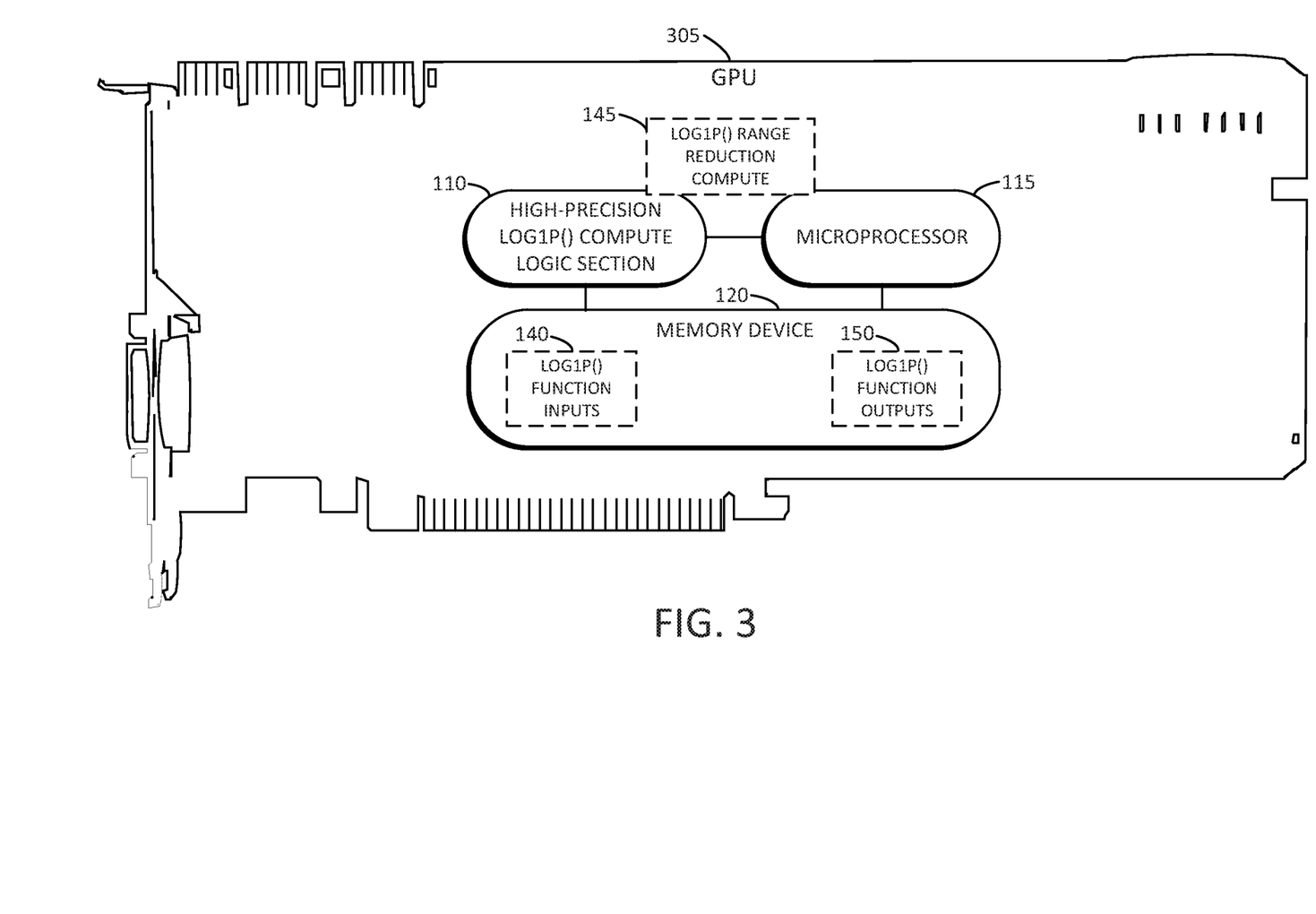
FIG. 3 is an example block diagram of a graphics processing unit (GPU) including a high-precision log 1p( ) compute logic section in accordance with embodiments disclosed herein.

FIG. 3 is an example block diagram of a graphics processing unit (GPU) 305 including the high-precision log 1p( ) compute logic section 110 in accordance with embodiments disclosed herein. The GPU 305 may perform the log 1p( ) range reduction technique 145 as described in detail herein. The GPU 305 may use at least one of the microprocessor 115, the high-precision log 1p( ) compute logic section 110, or the memory device 120 to perform the log 1p( ) range reduction technique 145.

Figure 4:
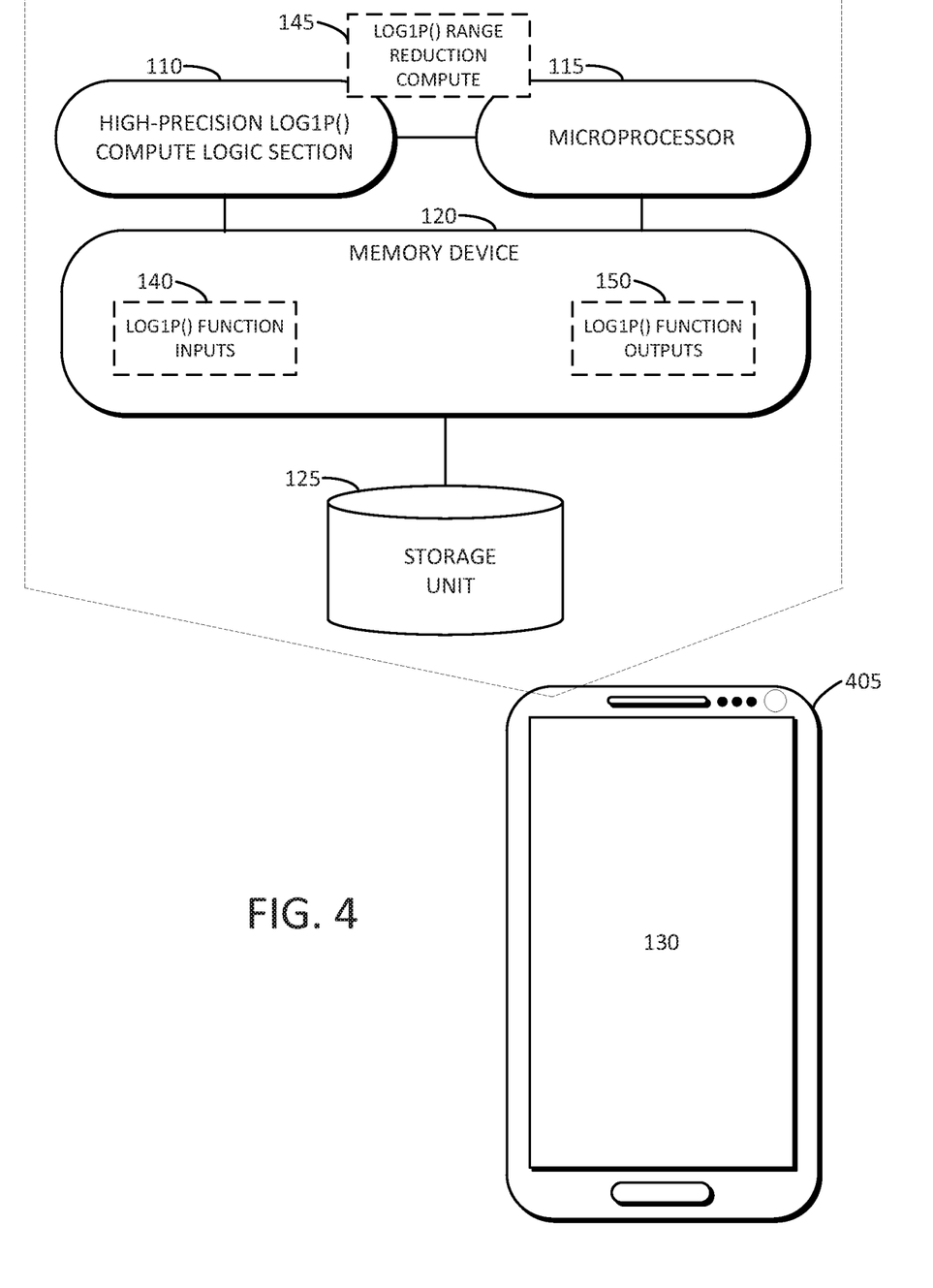
FIG. 4 is an example block diagram of a smart phone including a high-precision log 1p( ) compute logic section in accordance with embodiments disclosed herein.

FIG. 4 is an example block diagram of a smart phone 405 including the high-precision log 1p( ) compute logic section 110 in accordance with embodiments disclosed herein. The smart phone 405 may perform the log 1p( ) range reduction technique 145 as described in detail herein. The smart phone 405 may use at least one of the microprocessor 115, the high-precision log 1p( ) compute logic section 110, the memory device 120, or the storage unit 125 to perform the log 1p( ) range reduction technique 145.

Figure 5:
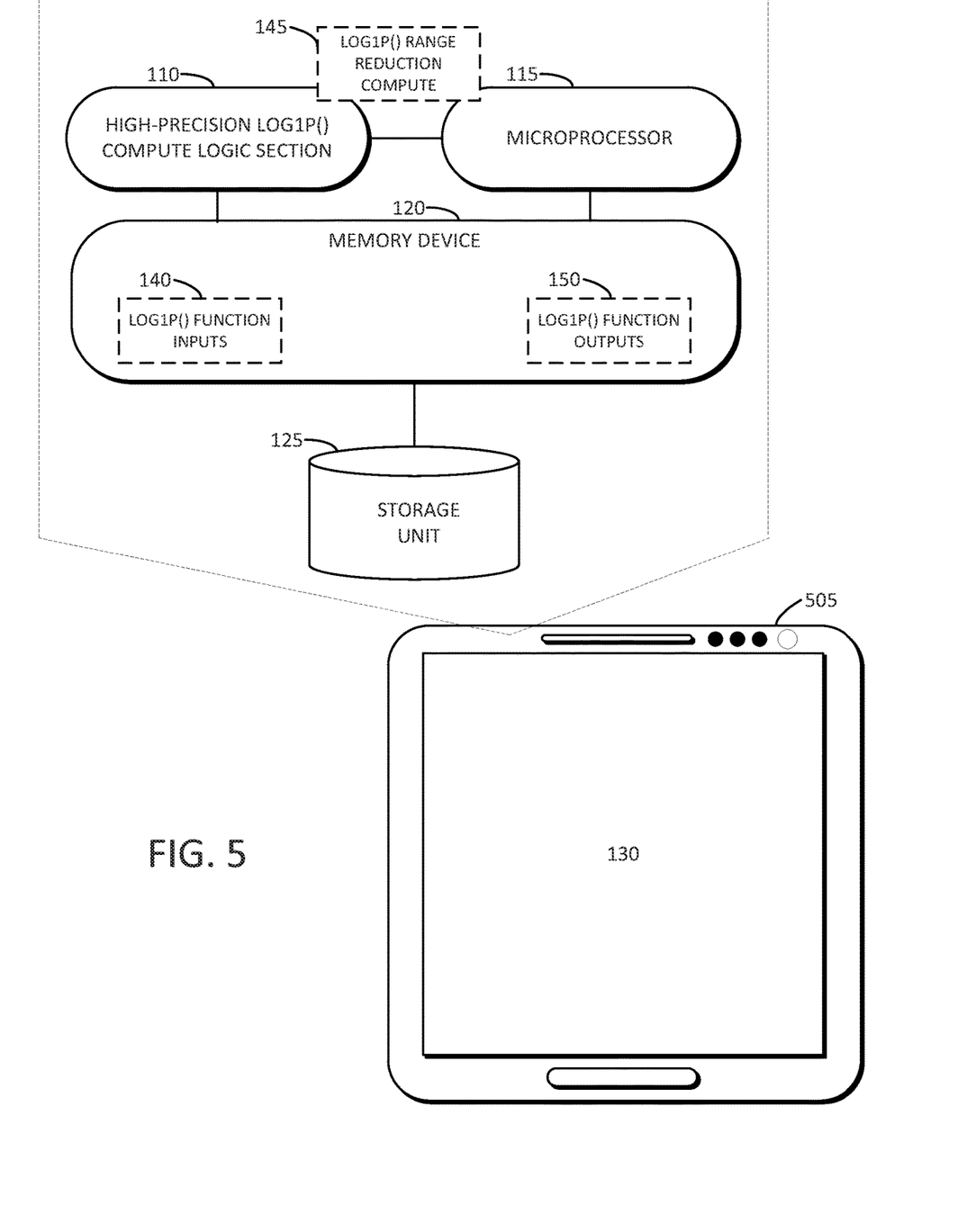
FIG. 5 is an example block diagram of a tablet including a high-precision log 1p( ) compute logic section in accordance with embodiments disclosed herein.

FIG. 5 is an example block diagram of a tablet 505 including the high-precision log 1p( ) compute logic section 110 in accordance with embodiments disclosed herein. The tablet 505 may perform the log 1p( ) range reduction technique 145 as described in detail herein. The tablet 505 may use at least one of the microprocessor 115, the high-precision log 1p( ) compute logic section 110, the memory device 120, or the storage unit 125 to perform the log 1p( ) range reduction technique 145.

Figure 6:
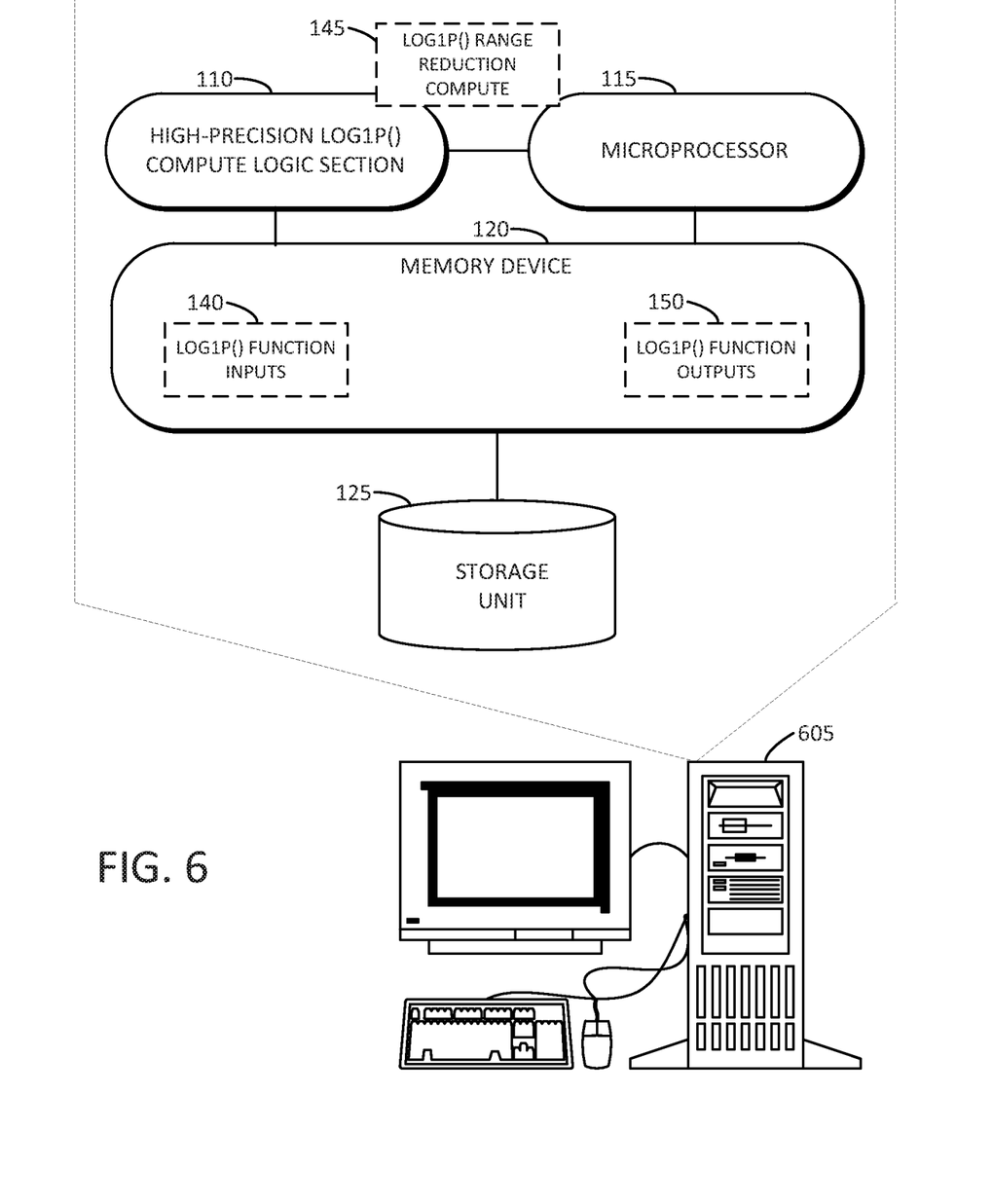
FIG. 6 is an example block diagram of a computer including a high-precision log 1p( ) compute logic section in accordance with embodiments disclosed herein.

FIG. 6 is an example block diagram of a computer 605 including the high-precision log 1p( ) compute logic section 110 in accordance with embodiments disclosed herein. The tablet 505 may perform the log 1p( ) range reduction technique 145 as described in detail herein. The computer 605 may use at least one of the microprocessor 115, the high-precision log 1p( ) compute logic section 110, the memory device 120, or the storage unit 125 to perform the log 1p( ) range reduction technique 145.

Figure 7:
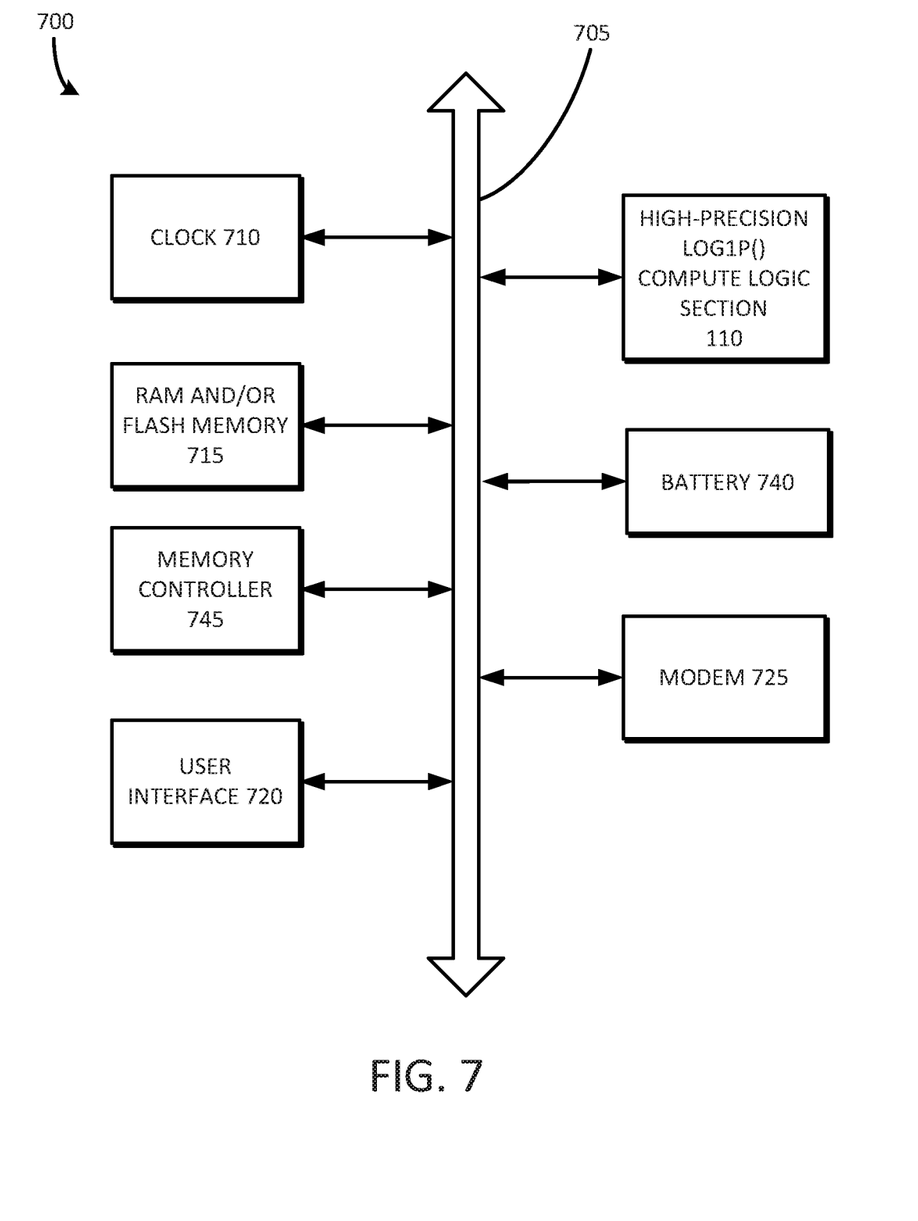
FIG. 7 is an example block diagram of a computing system including a high-precision log 1p( ) compute logic section according to embodiments disclosed herein.

FIG. 7 is an example block diagram of a computing system 700 including the high-precision log 1p( ) compute logic section 110 according to embodiments disclosed herein. The high-precision log 1p( ) compute logic section 110 may be the same as the high-precision log 1p( ) compute logic section 110 described herein, and may be electrically connected to a system bus 705. The computing system 700 may also include a clock 710, a random access memory (RAM) and/or flash memory 715, a memory controller 745, a user interface 720, a modem 725 such as a baseband chipset, and/or automated test equipment (ATE) 735, any or all of which may be electrically coupled to the system bus 705.

If the computing system 700 is a mobile device, it may further include a battery 740, which powers the computing system 700. Although not shown in FIG. 7, the computing system 700 may further include an application chipset, a camera image processor (CIS), a mobile DRAM, and the like. The memory controller 745 and the flash memory 715 may constitute a solid state drive/disk (SSD), which uses a nonvolatile memory to store data.

In example embodiments, the computing system 700 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computing machine, comprising:
a storage unit; and
a microprocessor including a high-precision log 1p( ) compute logic section configured to:
approximate a function $F(x)=\log 1p=\ln(x+1)$, using an estimation function $E(x)$;
receive an input x;
compute (x+1) using only native precision;
compute an integer N such that: $\frac{4}{3}2^{N-1} \leq (x+1) \leq \frac{4}{3}2^N$;
compute $f_N(x)=Sx+(S-1)$ where $S=2^{-N}$;
compute $E(f_N(x))$;
return a value $v=E(f_N(x))+N\ln(2)$ as an approximation of $F(x)=\log 1p(x)$;
perform automatic range reduction of the function $F(x)$ without using extended-precision arithmetic and without using a constant memory table; and
store the returned value in the storage unit.

2. The computing machine of claim 1, wherein the storage unit is a non-volatile storage unit, and wherein the high-precision log 1p( ) compute logic section is further configured to store the returned value in the non-volatile storage unit.

3. The computing machine of claim 1, wherein the storage unit is a volatile memory device, and wherein the high-precision log 1p( ) compute logic section is further configured to store the returned value in the volatile memory device.

4. The computing machine of claim 1, wherein the high-precision log 1p( ) compute logic section is further configured to transmit the returned value via an Input/Output (IO) interface chip.

5. The computing machine of claim 1, wherein the high-precision log 1p( ) compute logic section is further configured to show the returned value on a display device.

6. The computing machine of claim 1, wherein the computing machine is a graphic processing unit (GPU).

7. The computing machine of claim 1, wherein the computing machine is a smart phone.

8. The computing machine of claim 1, wherein the computing machine is a tablet.

9. The computing machine of claim 1, wherein the computing machine is a computer server.

10. A computing machine, comprising:
a storage unit;
a microprocessor; and
a high-precision log 1p( ) compute logic section;
wherein the microprocessor and the high-precision log 1p( ) compute logic section are configured to:
approximate a function $F(x)=\log 1p(x)=\ln(x+1)$, using an estimation function $E(x)$;
receive an input x;
compute (x+1) using only native precision;
compute an integer N such that: $\frac{4}{3}2^{N-1} \leq (x+1) \leq \frac{4}{3}2^N$;
compute $f_N(x)=Sx+(S-1)$ where $S=2^{-N}$;
compute $E(f_N(x))$;
return a value $v=E(f_N(x))+N\ln(2)$ as an approximation of $F(x)=\log 1p(x)$;

perform automatic range reduction of the function F(x) without using extended-precision arithmetic and without using a constant memory table;
store the returned value in the storage unit;
show the returned value on the display device; and
transmit the returned value via the IO interface chip.

11. The computing machine of claim 10, wherein the storage unit is a non-volatile storage unit, and wherein the high-precision log 1p( ) compute logic section is further configured to store the returned value in the non-volatile storage unit.

12. The computing machine of claim 10, wherein the storage unit is a volatile memory device, and wherein the high-precision log 1p( ) compute logic section is further configured to store the returned value in the volatile memory device.

13. The computing machine of claim 10, wherein the high-precision log 1p( ) compute logic section is further configured to transmit the returned value via an Input/Output (TO) interface chip.

14. The computing machine of claim 10, wherein the high-precision log 1p( ) compute logic section is further configured to show the returned value on a display device.

15. The computing machine of claim 10, wherein the computing machine is a graphic processing unit (GPU).

16. The computing machine of claim 10, wherein the computing machine is a smart phone.

17. The computing machine of claim 10, wherein the computing machine is a tablet.

18. The computing machine of claim 10, wherein the computing machine is a computer server.

\* \* \* \* \*